(12) United States Patent
Borghese et al.

(10) Patent No.: US 9,765,660 B2
(45) Date of Patent: Sep. 19, 2017

(54) INTERNAL BYPASS TO IMPROVE DECONGEALING OF SURFACE TYPE AIR TO OIL COOLERS

(71) Applicant: HONEYWELL INTERNATIONAL INC., Morris Plains, NJ (US)

(72) Inventors: Joseph B. Borghese, Yucca Valley, CA (US); Lili Pereyra, Mexico (MX); Steve Lawler, Murrieta, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 19 days.

(21) Appl. No.: 15/011,961

(22) Filed: Feb. 1, 2016

(65) Prior Publication Data

US 2016/0348548 A1 Dec. 1, 2016

Related U.S. Application Data

(60) Provisional application No. 62/168,177, filed on May 29, 2015.

(51) Int. Cl.
| | |
|---|---|
| *F01M 5/00* | (2006.01) |
| *F01M 5/02* | (2006.01) |
| *F02C 7/14* | (2006.01) |

(52) U.S. Cl.
CPC ............ *F01M 5/005* (2013.01); *F01M 5/002* (2013.01); *F01M 5/02* (2013.01); *F02C 7/14* (2013.01)

(58) Field of Classification Search
CPC .... F28F 2250/06; F28F 27/02; F28D 1/05375
USPC .......... 123/196 AB; 165/167, 174, 283, 297, 165/916
See application file for complete search history.

(56) References Cited

U.S. PATENT DOCUMENTS

| | | | | |
|---|---|---|---|---|
| 2,449,922 | A | | 9/1948 | Andersen |
| 4,537,346 | A | * | 8/1985 | Duprez ................... F01M 5/00 137/72 |
| 5,927,399 | A | * | 7/1999 | Kazakis ............... B01D 53/265 165/231 |
| 6,167,956 | B1 | * | 1/2001 | Bostedo ................. F04B 39/06 123/563 |
| 6,173,766 | B1 | * | 1/2001 | Nakamura ............ F28D 1/0435 123/196 AB |
| 7,854,256 | B2 | * | 12/2010 | Pineo ....................... F01M 5/00 165/101 |
| 8,978,992 | B2 | * | 3/2015 | Zillig .................... F15B 21/042 137/468 |
| 8,991,719 | B2 | * | 3/2015 | Sheppard ............... F01M 5/007 165/103 |
| 2004/0104010 | A1 | | 6/2004 | Kenny et al. |
| 2009/0255650 | A1 | * | 10/2009 | Magill ................. F28D 1/0333 165/103 |

FOREIGN PATENT DOCUMENTS

WO 2015108674 A1 7/2015

* cited by examiner

*Primary Examiner* — Marguerite McMahon
*Assistant Examiner* — James Kim
(74) *Attorney, Agent, or Firm* — Shimokaji IP

(57) ABSTRACT

A surface type air to oil cooler enables oil to flow from an inlet and down a first pass of an oil passageway. A first bypass, before the end of the first pass, allows oil to flow from the first pass to a second pass of the oil passageway. A second bypass may exist toward the end of the second pass to allow the oil to flow from the second pass to an outlet before the end of the second pass.

18 Claims, 5 Drawing Sheets

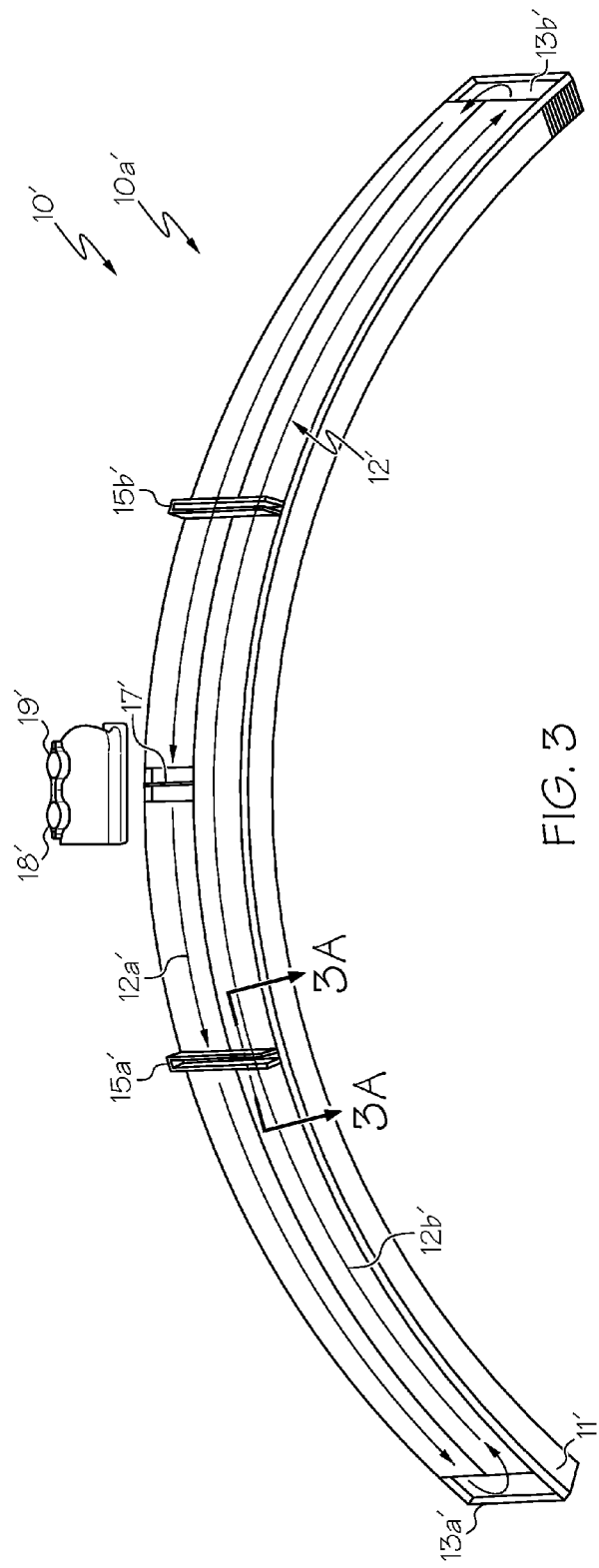
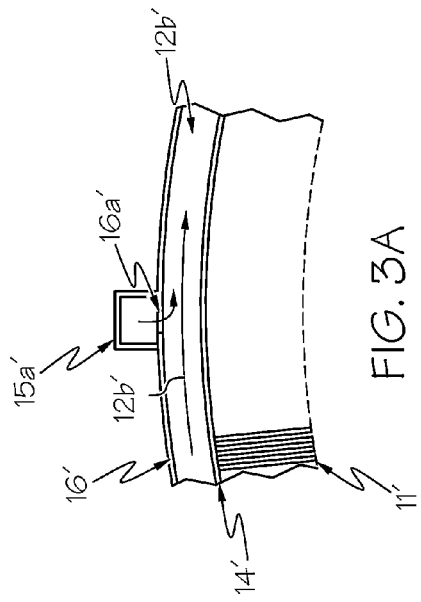
FIG. 3
FIG. 3A

INTERNAL BYPASS TO IMPROVE DECONGEALING OF SURFACE TYPE AIR TO OIL COOLERS

BACKGROUND OF THE INVENTION

The present invention generally relates to air to oil coolers and, more particularly, apparatus and methods for decongealing air to oil coolers.

During cold start or cold operation of engine oil coolers, the oil becomes extremely viscous and the pressure drop through the cooler becomes very high. These coolers are normally fitted with a pressure relief bypass valve which bypasses the cooler if the pressure drop in the cooler becomes excessive. In this case, during cold operation the oil appears congealed in the cooler core, the oil pressure drop is high and oil bypasses the cooler via the bypass valve. This is the normal function and helps to warm the oil up quickly in cold conditions.

The problem is that, under very cold conditions when cold air is flowing over or through the cooler, the oil remains very cold within the cooler core and continues to present a high pressure drop to the bypass valve. With no oil flow through the cooler core, the oil heats up by the heat added in the engine gearbox or generator and may exceed the oil temperature limit before the oil inside the cooler warms up enough to reduce the pressure drop through the core and establish oil flow. This problem is made worse in turbofan engine surface coolers where the oil flow length is distributed over a large arc of the fan case. The pressure relief bypass valve, usually mounted on the cooler, normally provides a source of heat from the warm bypassing oil to warm the core. If the bypass is thermally far away from the oil flow paths within the cooler core, the effect on decongealing will be limited.

As can be seen, there is a need for improved apparatus and methods for decongealing air to oil coolers.

SUMMARY OF THE INVENTION

In one aspect of the present invention, an air to oil cooler comprises an oil inlet; an oil outlet in communication with the oil inlet; a first pass in communication with the oil inlet, wherein the first pass enables oil to flow in a first direction, wherein the first pass has a first length; a second pass in communication with the oil outlet, wherein the second pass enables oil to flow in a second direction that is opposite the first direction; and a first bypass that communicates oil between the first pass and the second pass, wherein the first bypass is downstream of the oil inlet and at a position intermediate of the first length.

In another aspect of the present invention, an air to oil cooler comprises an oil inlet; an oil outlet in communication with the oil inlet; an oil passageway in communication with the oil inlet; a first pass in the oil passageway, wherein the first pass enables oil to flow in a first direction; a second pass in communication with the oil outlet, wherein the second pass enables oil to flow in a second direction that is opposite the first direction, wherein the second pass is one of an internal pass that is internal to the oil passageway and an external pass that is external to the oil passageway; and a first bypass that communicates oil between the first pass and the second pass.

In a further aspect of the present invention, an air to oil cooler comprises an oil inlet; an oil outlet in communication with the oil inlet; an oil passageway having: a first pass in communication with the oil inlet, wherein the first pass enables oil to flow in a first direction; a second pass in communication with the oil outlet, wherein the second pass enables oil to flow in a second direction that is opposite the first direction; a first plenum at a first distal end of the first pass; a second plenum at a second distal end of the first pass; a first bypass that communicates oil between the first pass and the second pass, wherein the first bypass is intermediate the first and second plenums.

These and other features, aspects and advantages of the present invention will become better understood with reference to the following drawings, description and claims.

BRIEF DESCRIPTION OF THE DRAWINGS

FIG. 3 is an exploded, perspective view of an air oil cooler according to another embodiment of the present invention;

FIG. 3A is a partial, schematic view of the air oil cooler of FIG. 3;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, this invention relates to surface type air oil coolers having one or more passes of an oil passageway or circuit. In this invention, one or more lower pressure drop paths are in the oil passageway. Each lower pressure drop path can include one or more bypasses. One or more of the bypasses can be located close to an oil pressure relief bypass valve.

The first and/or second bypasses can be made as gaps in the first and/or second passes, respectively. In such instances, the first and/or second bypasses are internal to the oil passageway. If one or more gaps may reduce the structural integrity of the cooler core, one or more bypasses can be made external to the oil passageway.

During cold operation of the cooler, with a bypass pressure relief valve and pressure drop applied across the oil inlet and oil outlet, some oil will flow into the inlet and then the oil passageway. Oil can then flow down a part of the full length of the first pass of the oil passageway. A first bypass or gap can exist, which allows oil to flow from the first pass to a second pass of the oil passageway, before an end of the first pass. A second bypass or gap may exist, before an end of the second pass, to allow oil to flow down a part of the full length of the second pass and to the outlet.

The bypasses or gaps can enable oil to bypass from the first pass to the second pass at all times. The division of the oil flow between the full length of the first and second passes and the oil flow through the bypasses is controlled by the flow area of each bypass gap. The oil flow through the bypasses is generally less than the oil flow through the full lengths of the first and second passes in order to maintain sufficient cooling.

As the oil warms up, the warm oil flowing through the bypass valve (with most of the oil bypassing the core altogether) will add heat into the core matrix, thereby warming the core locally and the oil within. As the bypasses can be physically located close to the warming bypass valve, the oil flow through the bypasses will continue to increase as the core is warmed. The lower pressure drop path of the oil through the bypasses will allow the core to decongeal much faster than if the bypasses were not present.

Figure 1:
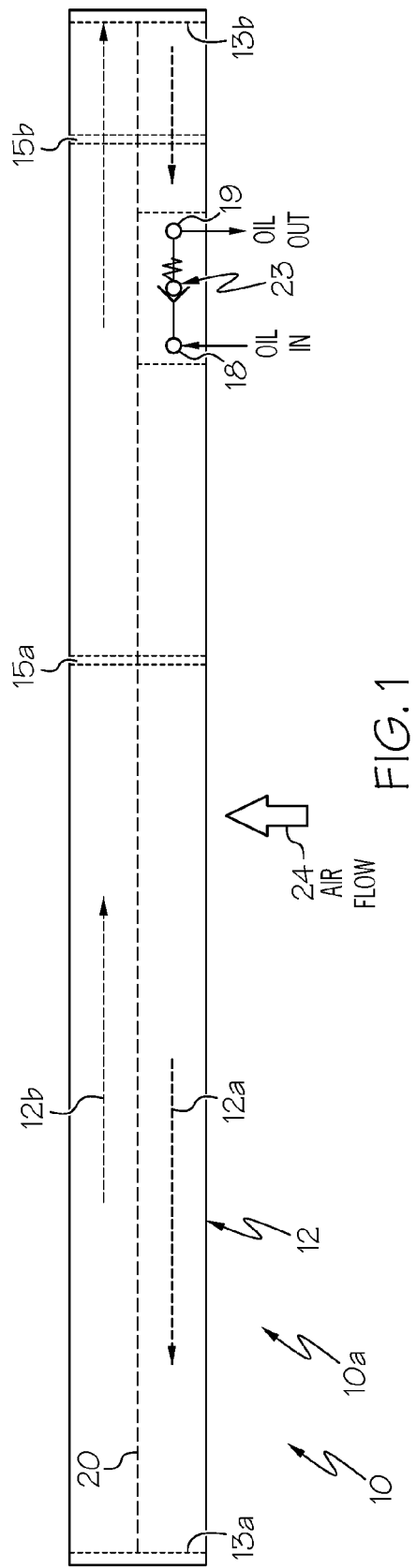
FIG. 1 is a schematic diagram of an air oil cooler according to an embodiment of the present invention.

FIG. 1 schematically depicts an embodiment of the present invention wherein an air oil cooler 10 can include a cooler core 10a having an air passageway (not shown) through which an air flow 24 can pass. In an embodiment, the air flow 24 can be in a cross flow or substantially perpendicular orientation to an oil flow in the cooler 10.

The cooler core 10a can further include an oil passageway 12 for the oil flow. The oil passageway 12 may be substantially perpendicular or perpendicular to the air passageway. The oil passageway 12 can include one or more internal passes, such as a first pass 12a and a second pass 12b, which are internal to the core 10a. The first pass 12a can be defined by a first length and can allow oil to flow in the first pass 12a in a first direction. The second pass 12b can be defined by a second length and can allow oil to flow in the second pass 12b in a second direction.

In an embodiment, the first direction is opposite the second direction. In embodiments, the first and second lengths can be the same or different. The entirety of the first and second passes, as defined by the sum of the first and second lengths, can be referred to as a "higher pressure drop path".

The cooler core 10a, and in particular the oil passageway 12, may further include a first plenum 13a at a first distal end of the oil passageway 12 and a second plenum 13b at an opposite, second distal end of the oil passageway 12. The first plenum 13a, at a distal end of the first length/first pass, may allow oil to flow from the first pass 12a to the second pass 12b. The second plenum 13b, at a distal end of the second length/second pass, may allow oil to flow from the second pass 12b to the first pass 12a.

One or more internal bypasses, such a first bypass 15a and a second bypass 15b, may be disposed all along widths of the first and second passes 12a, 12b. The one or more bypasses can also extend from the first pass 12a to the second pass 12b. In the event there are more than two passes, one or more bypasses may exist in and between two or more passes. In an embodiment, the internal bypass, such as the first and/or second bypasses 15a, 15b, is a gap.

In an embodiment, the first bypass 15a can be downstream of the inlet 18 and at a position intermediate of or less than an entire first length of the first pass 12a. In other words, the first bypass 15a can be disposed between or intermediate the first plenum 13a and the second plenum 13b. Moreover, the first bypass 15a can be disposed between the inlet 18 and a first distal end of the first pass 12a.

In an embodiment, the second bypass 15b can be downstream of the inlet 18, downstream of the first bypass 15a, and upstream of the outlet 19. The second bypass 15b can be at a position intermediate of or less than an entire second length of the second pass 12b. In other words, the second bypass 15b can be disposed between or intermediate the first plenum 13a and the second plenum 13b. Moreover, the second bypass 15b can be positioned between the first bypass 15a and the second plenum 13b.

Thereby, oil is enabled to flow from the inlet 18, into the first pass 12a, through the first bypass 15a, and to the second pass 12b. Similarly, oil is enabled to flow from the second pass 12b, through the second bypass 15b, to the first pass 12a, and exit the outlet 19. The foregoing oil path may be referred to as a "lower pressure drop path" and characterizes the lower pressure drop, when compared to the higher pressure drop path, between the oil inlet 18 and oil outlet 19.

An interpass bar 20 may extend between and along the entire lengths of the passes, such as the first and second passes 12a, 12b. The bar 20 may be a solid structure that physically separates oil flowing in the passes. However, the bar 20 can be segmented or have a gap(s) to allow the bypass(es) to flow oil between the passes.

The oil inlet 18, in communication with the cooler core 10a, may allow oil to flow into the first pass 12a while the oil outlet 19 may allow oil to flow out of the second pass 12b. A pressure relief bypass valve 23 (PRBV) may be intermediate or between the inlet 18 and the outlet 19. The PRBV 23 may allow all or some oil to bypass the cooler 10 when there is a relatively high pressure drop across the inlet 18 and outlet 19, such as when the cooler 10 is in a relatively cold condition. During such cold condition, the PRBV 23 may absorb heat from the bypassed oil and other nearby components, and then transfer some or all of the absorbed heat to the cooler core 10a and/or the oil therein that is relatively congealed.

Figure 2:
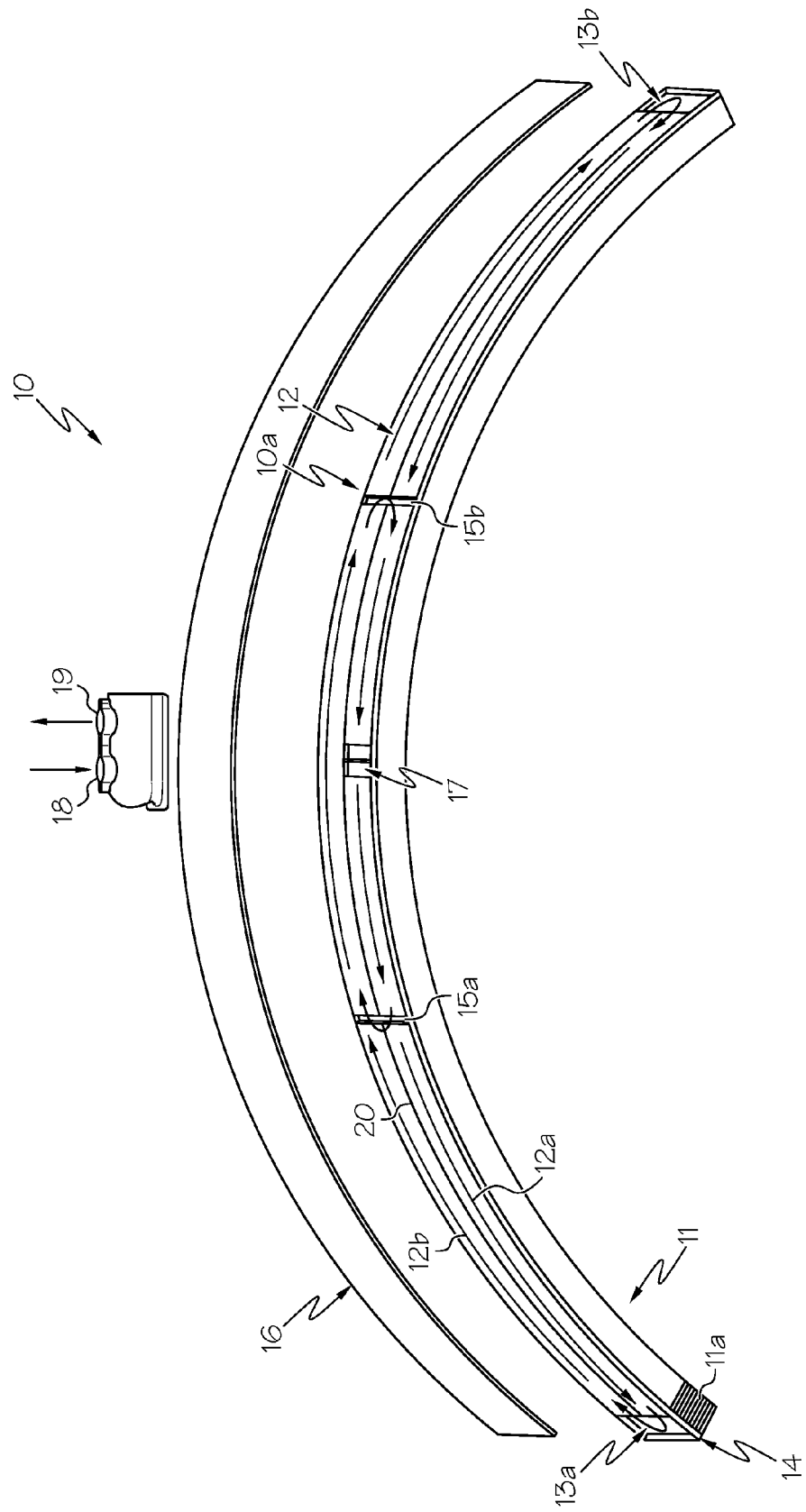
FIG. 2 is an exploded, perspective view of an air oil cooler according to an embodiment of the present invention.

FIG. 2 is an exemplary embodiment of FIG. 1. Differences between the embodiments of FIGS. 1 and 2 include the location of the inlet 18 and outlet 19. The embodiment of FIG. 2 further depicts a top plate 14 and a back plate 16.

In FIG. 2, the air oil cooler 10 includes the cooler core 10a having the air passageway 11 that may extend entirely between the first and second distal ends of the core 10a. In an embodiment, the air passageway 11 may include fins 11a, such as serpentine shaped fins, that can create a plurality of air flow paths within the air passageway 11. The fins 11a can exist throughout the entire air passageway 11, or just a portion thereof. In an embodiment, an air flow in the air passageway 11 can be in a cross flow orientation to an oil flow in the cooler 10.

In FIG. 2, the oil inlet 18 and oil outlet 19 are depicted in a position that is about at a midpoint between the first and second distal ends of the cooler 10. The inlet 18 and outlet 19 can be in communication with an inlet/outlet plenum 17 which, in turn, communicates with the first pass 12a. The inlet/outlet plenum 17 contains a solid bar which divides the inlet plenum from the outlet plenum.

Also, in the embodiment of FIG. 2, a top plate 14 separates the air passageway 11 from the oil passageway 12. A back plate 16 covers the oil passageway 12. Thereby, the cooler core 10a can have a sandwiched or layered configuration of the air passageway 11, the top plate 14, the oil passageway 12, and the back plate 16.

Figure 2A:
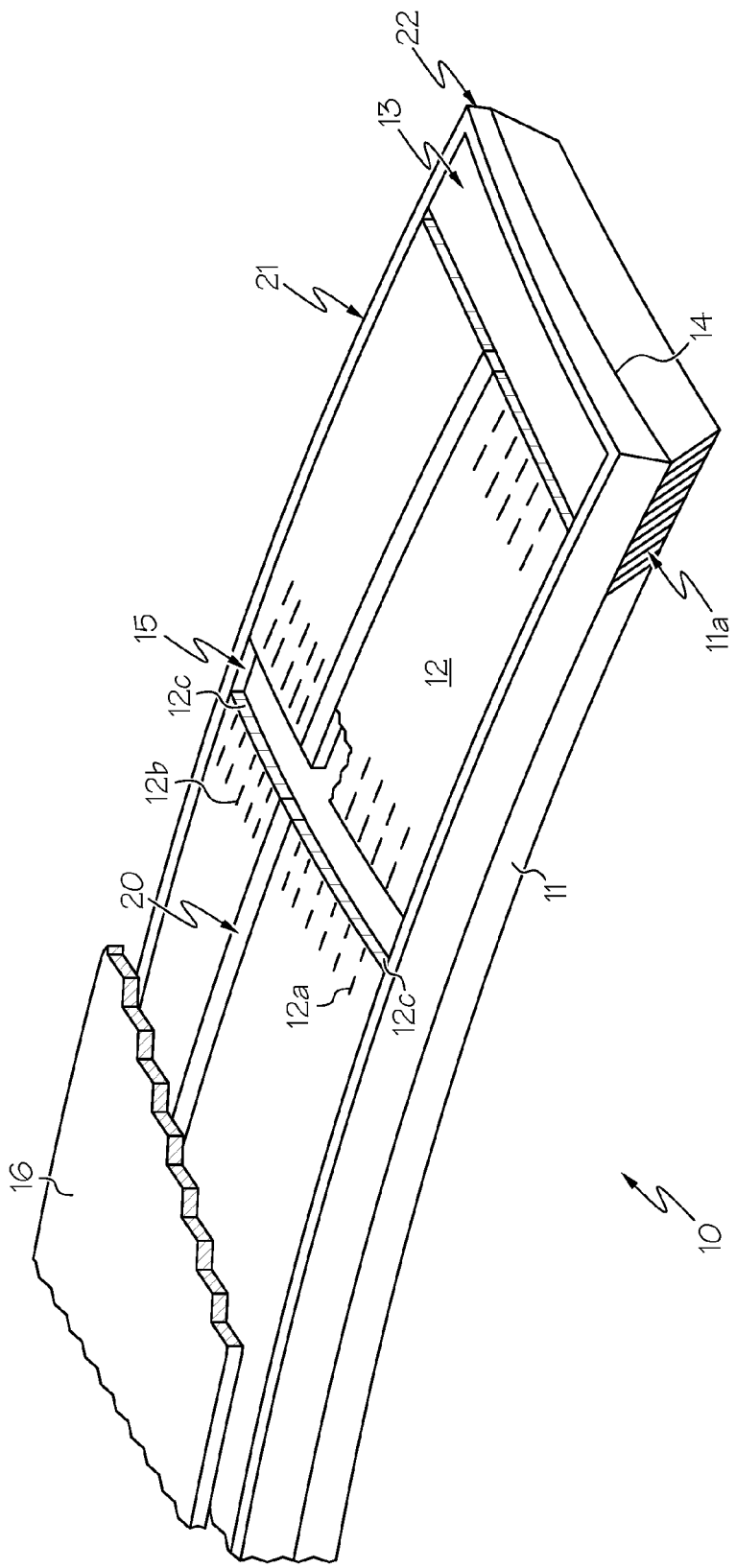
FIG. 2A is a partial, perspective, cut away view of the air oil cooler of FIG. 2.

FIG. 2A is a partial, perspective, cut-away view of FIG. 2. The cooler 10 may include a pair of side bars 21, one of which can extend along and adjacent an entire length of the first pass 12a, and another of which can extend along and adjacent an entire length of the second pass 12b.

The cooler may further include a pair of end bars 22, one of which is adjacent to the first plenum 13a and at the first distal end of the cooler core 10a. The other end bar 22 is adjacent to the second plenum 13b and at the second distal end of the cooler core 10a.

In FIG. 2A, it can be seen that the first pass 12a and the second pass 12b can include fins 12c, such as serpentine, plain or offset shape fins, that may extend across the entire widths of the first and second passes. The fins 12c may also extend along the entire lengths of the first and second passes, or in other words extend between the first and second plenums 13a, 13b.

FIGS. 3 and 3A depict another embodiment of the present invention. This embodiment is generally the same as the embodiments of FIGS. 1, 2 and 2A. However, in the embodiment of FIGS. 3 and 3A, one or more bypasses are disposed external to the oil passageway, rather than internal to the oil passageway.

In FIG. 3, a cooler 10' includes a core 10a' having an air passageway 11' and an oil passageway 12'. The oil passageway 12' includes a first pass 12a' and a second pass 12b'. A first plenum 13a' and a second plenum 13b' are at opposite distal ends of the core 10a'. Oil enters and exits the core 10a' via an inlet 18', an outlet 19', and a plenum 17'. A first bypass 15a', which in this embodiment is an external bypass, allows oil to flow from the first pass 12a' to the second pass 12b'. A second bypass 15b', which in this embodiment is an external bypass, allows oil to flow from the second pass 12b' to the first pass 12a'.

In FIG. 3A, which is a drawing of FIG. 3 taken along A-A, it can be seen that one or more of the bypasses—such as the first and second bypasses 15a', 15b'—are external to the passes, such as the first and second passes 12a', 12b'. In the embodiment depicted, the first and second bypasses 15a', 15b' are channels. To enable the operation of the external bypasses, the back plate 16' may have one or more holes 16a' that communicate with the first and second passes, in an embodiment.

The present invention further envisions that one or more external bypasses can be combined with one or more internal bypasses. The present invention also envisions that the external bypasses can be on a side of the oil passageway immediately adjacent the air passageway, rather than immediately adjacent the oil passageway.

Figure 4:
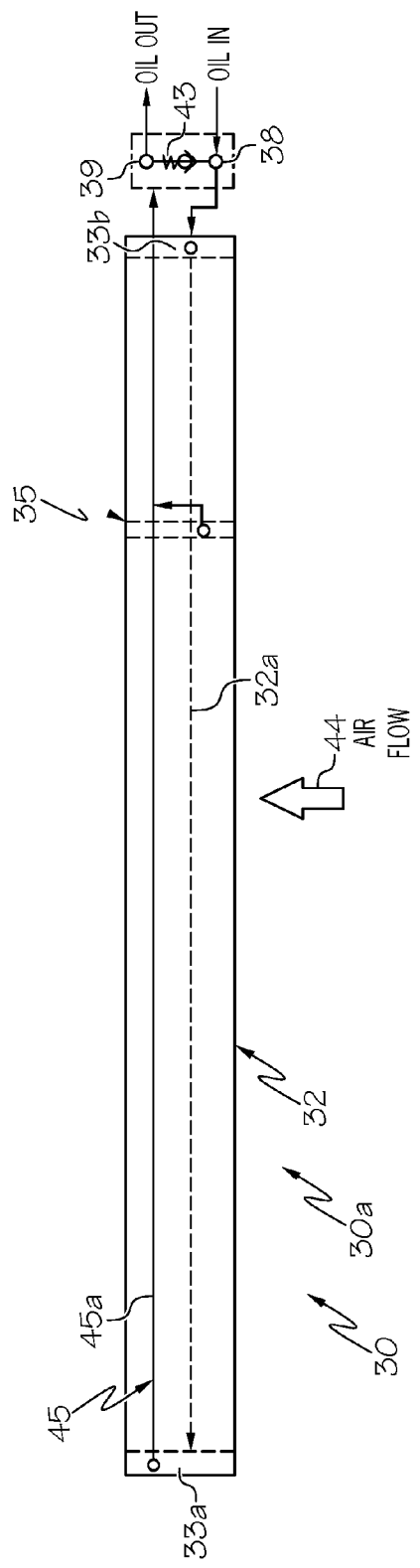
FIG. 4 is a schematic diagram of an air oil cooler according to another embodiment of the present invention.

FIG. 4 is a schematic view of another embodiment of the present invention. FIG. 4 represents what might be called a single pass cooler in contrast to the two pass cooler described above. However, the embodiment of FIG. 4 can also be characterized as a two pass cooler, with one pass being external to the cooler core or oil passageway, and the other pass being internal to the cooler core or oil passageway.

In FIG. 4, an air oil cooler 30 includes a cooler core 30a. An air flow 44 in an air passageway (not shown) can be in a cross flow with an oil passageway 32. The oil passageway 32 can include a first pass 32a that enables oil flow, in a first direction, towards a first plenum 33a at one distal end of the core 30a. A second plenum 33b is at an opposite distal end of the core 30a. An oil inlet 38 and an oil outlet 39 may be on opposite sides of a PRBV 43, and the oil inlet 38 may be in communication with the second plenum 33b.

A bypass 35 can be intermediate the oil inlet 38 and the first plenum 33a. In an embodiment, the bypass 35 can be an external bypass similar to the bypass 15a' of FIG. 3.

A bypass 45 can be external to the oil passageway 32 and thus to the first pass 32a. In an embodiment, the bypass 45 is a tube. The bypass 45 can provide a second pass 45a of oil flow in a second direction that is opposite the first direction of the first pass 12a. The second pass 45a can provide oil flow communication from the first plenum 33a to the outlet 39.

Thereby, oil from the first pass 32a can flow through one or more holes in a back plate (not shown) and into the bypass 35. From the bypass 35, oil can then flow into the second pass 45a of the bypass tube 45, and then out at the outlet 39.

It should be understood, of course, that the foregoing relates to exemplary embodiments of the invention and that modifications may be made without departing from the spirit and scope of the invention as set forth in the following claims.

We claim:

1. An air to oil cooler, comprising:
   an oil inlet;
   an oil outlet in communication with the oil inlet;
   a first plenum at a first distal end of the cooler;
   a second plenum at a second distal end of the cooler;
   a first pass in between the first and second plenums and in communication with the oil inlet, wherein the first pass enables oil to flow in a first direction, wherein the first pass has a first length;
   a second pass in between the first and second plenums and in communication with the oil outlet, wherein the second pass enables oil to flow in a second direction that is opposite the first direction; and
   a first bypass that communicates oil between the first pass and the second pass, wherein the first bypass is positioned outside of the first and second plenums, downstream of the oil inlet, and at a position intermediate of and less than an entirety of the first length.

2. The cooler of claim 1, further comprising a cooler core in communication with the inlet and outlet and wherein:
   the first pass is internal to the cooler core; and
   the second pass is internal to the cooler core.

3. The cooler of claim 1, further comprising a cooler core in communication with the inlet and outlet and wherein:
   the first pass is internal to the cooler core; and
   the second pass is external to the cooler core.

4. The cooler of claim 1, further comprising a pressure relief bypass valve between the inlet and the outlet.

5. The cooler of claim 1, further comprising an air passageway that flows air in a cross flow direction to the first and second directions.

6. An air to oil cooler, comprising:
   an oil inlet;
   an oil outlet in communication with the oil inlet;
   an oil passageway in communication with the oil inlet;
   a first pass in the oil passageway, wherein the first pass enables oil to flow in a first direction, wherein the first pass has a first length;
   a second pass in communication with the oil outlet, wherein the second pass has a second length and enables oil to flow in a second direction that is opposite the first direction, wherein the second pass is one of an internal pass that is internal to the oil passageway and an external pass that is external to the oil passageway;
   wherein the first and second passes extend between first and second plenums at opposite distal ends of the cooler; and
   a first bypass that communicates oil between the first pass and the second pass;
   wherein the first bypass is positioned outside of the first and second plenums and at a position intermediate of the first length.

7. The cooler of claim 6, wherein the first bypass is internal to the first and second passes.

8. The cooler of claim 6, wherein the first bypass is external to the first and second passes.

9. The cooler of claim 6, wherein the first bypass is a gap in the first pass and the second pass, and extends from the first pass to the second pass.

10. The cooler of claim 6, wherein the first bypass is a channel that is exterior to the first pass and the second pass.

11. The cooler of claim 6, wherein the second pass is a tube.

12. The cooler of claim 6, further comprising back plate having a hole therein, wherein the back plate interfaces the first bypass.

13. An air to oil cooler, comprising:
- an oil inlet;
- an oil outlet in communication with the oil inlet;
- an oil passageway having:
    - a first pass in communication with the oil inlet, wherein the first pass enables oil to flow in a first direction, wherein the first pass has a first length;
    - a second pass in communication with the oil outlet, wherein the second pass has a second length and enables oil to flow in a second direction that is opposite the first direction;
    - a first plenum at a first distal end of the first pass;
    - a second plenum at a second distal end of the first pass;
    - a first bypass that communicates oil between the first pass and the second pass, wherein the first bypass is positioned outside of the first and second plenums and at a position intermediate of the first length;
    - a second bypass that communicates oil between the second pass and the first pass, wherein the second bypass is positioned outside of the first and second plenums and at a position intermediate of the second length.

14. The cooler of claim 13, further comprising an air passageway that interfaces the oil passageway.

15. The cooler of claim 13, further comprising a back plate that interfaces the oil passageway.

16. The cooler of claim 13, wherein the first bypass is a gap in the first pass and the second pass, and extends from the first pass to the second pass.

17. The cooler of claim 13, wherein the first bypass is a channel that extends from the first pass to the second pass, and is exterior to the first pass and the second pass.

18. The cooler of claim 13, wherein the second bypass is disposed exterior to the oil passageway.

* * * * *